US011754832B1

(12) United States Patent
Wu et al.

(10) Patent No.: US 11,754,832 B1
(45) Date of Patent: Sep. 12, 2023

(54) WAVEFRONT TESTER CALIBRATION METHOD

(71) Applicant: MLOptic Corp, Redmond, WA (US)

(72) Inventors: Pengfei Wu, Bellevue, WA (US); Wei Zhou, Sammamish, WA (US); Wei Wang, Nanjing (CN); Yongshui Cai, Nanjing (CN)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 18/123,773

(22) Filed: Mar. 20, 2023

(51) Int. Cl.
    *G02B 27/00*     (2006.01)
    *G02B 27/64*     (2006.01)
    *G02B 27/10*     (2006.01)
    *G02B 27/09*     (2006.01)

(52) U.S. Cl.
    CPC ..... *G02B 27/0068* (2013.01); *G02B 27/0988* (2013.01); *G02B 27/1066* (2013.01); *G02B 27/64* (2013.01)

(58) Field of Classification Search
    CPC ............ G02B 27/0068; G02B 27/0988; G02B 27/1066; G02B 27/64
    USPC .......................................................... 359/642
    See application file for complete search history.

(56) References Cited

U.S. PATENT DOCUMENTS

2003/0169402 A1*    9/2003    Persoff ................. A61B 3/1015
                                                      351/211

* cited by examiner

*Primary Examiner* — Wyatt A Stoffa
*Assistant Examiner* — Mitchell T Oestreich
(74) *Attorney, Agent, or Firm* — Jong Patent Firm; Cheng Ning Jong; Tracy P. Jong

(57) ABSTRACT

A wavefront calibration method for a wavefront tester of a lens, the method including: measuring an air wavefront of the wavefront tester without the lens; measuring at least one golden sample wavefront to generate an actual wedge angle and refractive index of the at least one golden sample based on the air wavefront; calculating a measured wedge angle and refractive index based on the actual wedge angle and refractive index of the at least one golden sample; and linear fitting between the actual wedge angle and refractive index and the measured wedge angle and refractive index to produce an actual magnification of the lens.

10 Claims, 4 Drawing Sheets

WAVEFRONT TESTER CALIBRATION METHOD

BACKGROUND OF THE INVENTION

1. The Field of the Invention

The present invention relates to a wavefront tester calibration method. More specifically, the present invention is directed to a wavefront tester calibration method utilizing golden samples.

2. Background Art

Wavefront measurements are useful for measuring directly, the phase and intensity of a light beam. Wavefront aberration is one of the most important parameters for an optical system and thus is critical for many applications, e.g., optical system alignment, Modulation Transfer Function (MTF) measurement, reflective surface testing, transparent optics testing, laser beam and optics, adaptive optics, ophthalmology and Augmented Reality/Virtual Reality (AR/VR) and Near-Eye Display. In the field of optical system alignment, optical alignment is a common problem and can be complicated and time consuming. Wavefront measurements provide valuable assessments for a successful alignment operation. Real-time measurements of on-axial and off-axial wavefronts allows the characterization of an optical alignment for both optic components and optical systems, enabling a quick and precise alignment of an optical beam such as its pupil position and tip/tilt angles. An MTF measurement is the most common way to characterize the optical quality. Most MTF measurements are based on measuring the contrast of a specific test pattern imaged by the lens of interest. However, the measurement does not allow tracing of the origin of the problem. Wavefront measurements provide the most complete way to characterize the quality of an optical system and an alternative way to measure MTF. A single wavefront measurement enables direct access to the aberrations of the lens of interest as well as the MTF measurement in all directions. In reflective surface testing, a wavefront sensor allows precise and reliable measurement of a mirror shape during or after polishing which is an act critical to obtain the desired optical quality. Wavefront measurements are also important to characterize wavefront errors of some regions of interest of mirrors including dielectric or metallic coatings of mirrors. In transparent optics testing, for transparent optics including optic plates, filters and dichroic beam splitter or coatings, the transmission measurements can be performed to obtain wavefront errors of the optics in either single pass or double pass.

In laser beam and optics, wavefront measurements are useful for characterizing the propagation of an electromagnetic field such as a laser beam in free space, making them very useful for diagnosis of laser beam and optics quality and related applications in laser system development, integration and maintenance. Adaptive optics has been used in many areas including astronomical telescope, biomedical imaging systems and free-space optical communications. The temporal measurement of wavefront distortion can be used to correct aberrations in optical systems to improve image quality. In ophthalmology, wavefront measurements can be used to assess an individual's visual performance and detect visual aberrations or distortions, which can aid in the diagnosis of visual disorders such as myopia, hyperopia and astigmatism. In an AR/VR and Near-Eye display, wavefront errors from the AR/VR light sources, micro display panels and waveguides are important indicators for assessment of AR/VR device quality. Wavefront measurements constitute a powerful tool to diagnose holographic waveguides, micro-lens, curved windows and heated windshields.

Optical surfaces shall be carefully characterized at each manufacturing step for almost all types of optics. Interferometers utilize the interference of superimposed electromagnetic waves to extract the phase and intensity information from an object under test. They have been widely used in the measurements of microscopic displacements, refractive index changes and surface irregularities for inspections of optical components or systems in both science and industry including astronomy, optics, engineering metrology, seismology, remote sensing, biomedicine, mechanical stress/strain measurement, velocimetry, and optometry. There are many different types of interferometers including Fizeau, Mach-Zehnder and Fabry-Pérot interferometers. In some instances, optical interferometry is specially designed for the high precision examination of surface topography using techniques, e.g., phase shifting interferometry and vertical scanning interferometry. Interferometers are very sensitive to the changes of test environments, such as vibration, movement, acoustic noise, air turbulence, temperature and humidity. They also have very small dynamic range for measurements and are suitable only for measuring small changes rather than large range of measurements. The field of view is typically narrow as well, which limits their ability to observe large objects or areas. In addition, the systems can be complex and difficult to set up and maintain, requiring specialized knowledge and technical skills. As such, most interferometers are expensive, especially those having high sensitivity and spatial resolution.

A Shack-Hartmann wavefront sensor utilizes a relatively new technique for wavefront measurements. It is a competitive alternative, offering an excellent trade-off in terms of performance, versatility and ease of use. The wavefront sensor combines a two-dimensional (2D) detector with a lenslet array. The sensor allows direct wavefront measurements rather than using interferences between beams to reconstruct a wavefront. These devices were developed for adaptive optics and have been widely used in optical metrology and laser diagnostics. Compared to the interferometers, a Shack-Hartmann wavefront sensor has a larger measurable range and it is more resistant to test environmental variations. The sensor is also suitable for measuring large optics, which has been challenging, especially for some large mirrors that are designed to work in the infrared spectral bands. The sensor can perform a rapid and accurate measurement of the curvature of optics surfaces. Interferometers are incapable for use with such measurements due to their limited measurable ranges. A Shack-Hartmann sensor, however, has very limited spatial resolution and may not be able to accurately measure small wavefront distortions. It also requires a well-illuminated wavefront and may not work well with weak or poorly collimated light sources. As such, an effective calibration method is required to precisely measure the wavefront of an optical system. Wavefront measurements can be sensitive as small errors affect measurement results tremendously. As mechanical tolerances are much larger than the wavefront of an optical system, mechanical errors need to be removed for wavefront measurements to be effective. Further, a light source, e.g., laser source as well as a collimated laser beam are imperfect and alignment errors associated with the light source need to be removed as well. Actual optical amplifications may be slightly different from designed amplifications. In one calibration method, amplification numbers are applied directly from optics design to a software algorithm. However, this calibration method is highly dependent upon the mechanical tolerances as well as the alignment of optical devices. If the system is changed over time, the desired calibration may no longer be accurate. In another calibration method, an actual object is calibrated with a tester system, which requires the sensor to have a high spatial resolution to calibrate the measured and actual sizes of the object. Unfortunately, for a wavefront sensor, the resolution is normally very low as the pixel size is about 150 um. Currently available systems using Shack-Hartmann sensors do not offer multiple configurable features with automatic calibration or measurement processes. For different applications and requirements, multiple and different setups are required for successful measurements.

There exists a need for a wavefront calibration method of a wavefront tester useful for producing calibration results that are reliable for subsequent measuring of wavefront characteristics of a lens or an optical system.

SUMMARY OF THE INVENTION

In accordance with the present invention, there is provided a wavefront calibration method for a wavefront tester of one of a lens and an optical system under test, the method including:
(a) measuring an air wavefront of the wavefront tester without the lens and the optical system under test;
(b) measuring at least one golden sample wavefront to generate an actual wedge angle and refractive index of said at least one golden sample based on the air wavefront;
(c) calculating a measured wedge angle and refractive index based on the actual wedge angle and refractive index of the at least one golden sample; and
(d) linear fitting between the actual wedge angle and refractive index and the measured wedge angle and refractive index to produce an actual magnification of the at least one golden sample.

In one embodiment, the method further includes repeating steps (b)-(d) with another one of the at least one golden sample to produce a new actual magnification and averaging the new actual magnification and the actual magnification to produce an average actual magnification. In one embodiment, the wavefront tester includes a plurality of optical lenses from which to select, the method further includes selecting an optical lens from the plurality of optical lenses for use in the wavefront tester prior to the first measuring step. In one embodiment, the at least one golden sample is an optics of a known shape and surface error distribution.

In one embodiment, the wavefront tester includes:
(a) a mirror;
(b) an imaging lens;
(c) an aperture;
(d) a beam splitter;
(e) a wavefront sensor;
(f) an optical lens disposed in the optical path; and
(g) a light source directed in a first direction through the optical path by the beam splitter through the optical lens and the at least one golden sample to the mirror such that the light source is redirected in a second direction opposite the first direction through the optical path and the beam splitter, the aperture and the imaging lens to be received at the wavefront sensor.

In one embodiment, the wavefront tester includes:
(a) an imaging lens;
(b) an aperture;
(c) a collimating lens;
(d) a wavefront sensor;
(e) an optical lens disposed in the optical path; and
(f) a light source directed in a direction through the optical path characterized by the collimating lens, the at least one golden sample, the optical lens, the aperture and the imaging lens to be received at the wavefront sensor.

In one embodiment, the light source is configured to be a spatial filtered light source with a spatial filter. In one embodiment, the light source includes a laser light source.

An object of the present invention is to provide a wavefront tester calibration method which results in accurate measurements of the wavefront of a lens.

Another object of the present invention is to provide a calibration method that is simple to conduct and one which removes contributions of air wavefront.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—double-pass wavefront tester
4—single-pass wavefront tester
6—mirror
8—beam splitter
10—wavefront sensor
12—light source, e.g., laser
14—spatial filter
16—aperture
18—imaging lens
20—collimating lens
22—sample, e.g., lens, optical system, optics, golden sample of known shape and surface error distribution 24—optical lens, e.g., collimating lens
26—method for calibrating wavefront tester
28—step of selecting configuration
30—step of measuring air wavefront
32—step of inserting golden sample into optical path to be measured
34—step of setting related parameters of golden sample
36—step of calculating wavefront data, e.g., wedge angle
38—step of saving calibration results in a configuration file
40—actual wedge angle vs. measured wedge angle plot
42—linear fit line

PARTICULAR ADVANTAGES OF THE INVENTION

The present wavefront calibration method can be conducted quickly and in one embodiment, in an automated fashion. It involves using golden samples for calibration to eliminate errors from both its light source and optical devices associated with the wavefront tester useful to be calibrated using the present calibration method such that the wedge angle and refractive index of a sample can be subsequently precisely measured. The present wavefront calibration method involves one or more steps which remove air wavefront during the measurement phase of the calibration method to remove air error.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
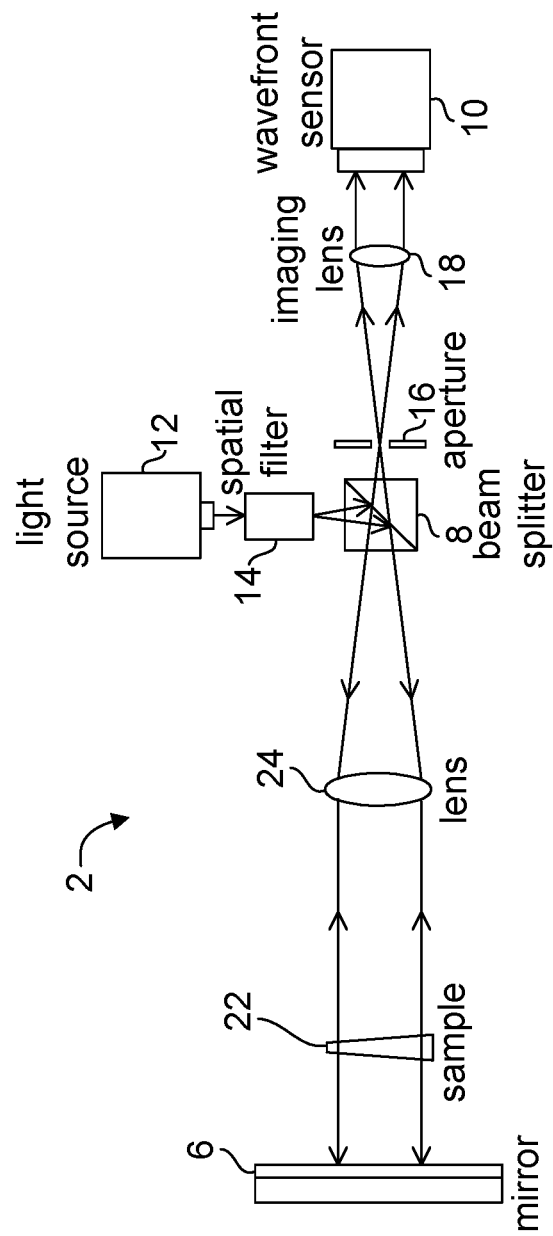
FIG. 1 is a diagram depicting a double-pass wavefront tester.
Figure 2:
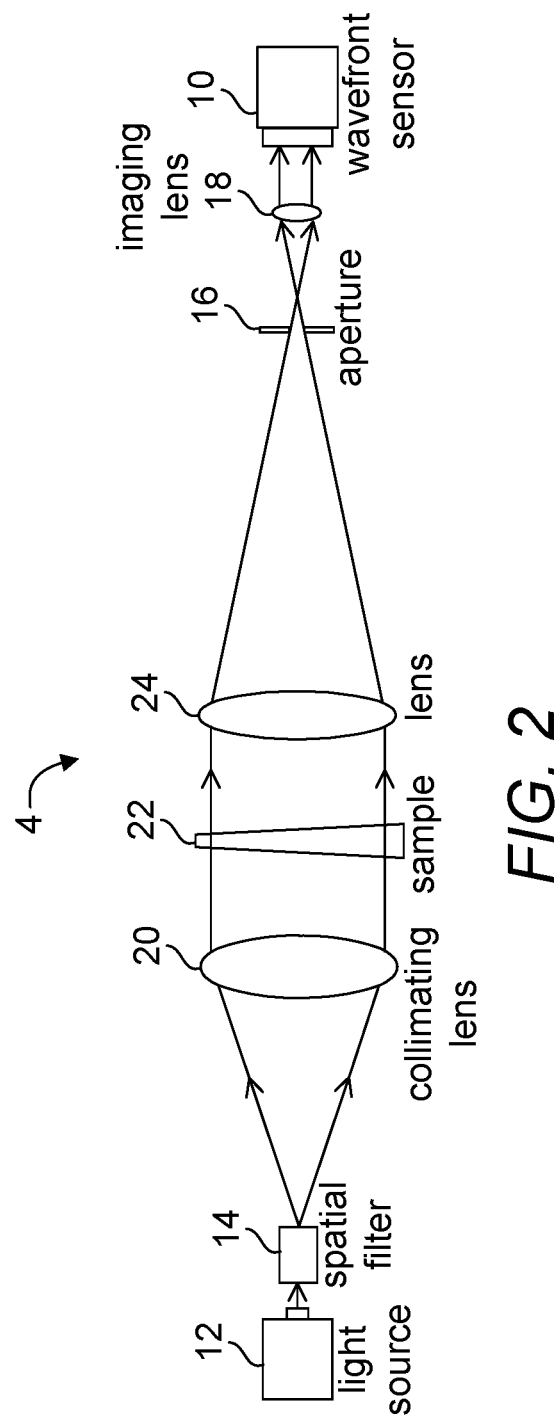
FIG. 2 is a diagram depicting a single-pass wavefront tester.

FIG. 1 is a diagram depicting a double-pass wavefront tester 2. FIG. 1 depicts a wavefront tester for measuring the wavefront of a sample 22 via an optical path, the wavefront tester 2 includes a mirror 6, an imaging lens 18, an aperture 16, a beam splitter 8, a wavefront sensor 10, an optical lens 24 disposed in the optical path and a light source 12 directed in a first direction through the optical path by the beam splitter 8 through the optical lens 24 and the sample or lens under test 22 to the mirror 6 such that the light source 12 is redirected in a second direction opposite the first direction through the optical path and the beam splitter 8, the aperture 16 and the imaging lens 18 to be received at the wavefront sensor 10. In one embodiment, the light source 12 is configured to be a spatial filtered light source with a spatial filter 14. A wavefront sensor is a device used in optics to measure the properties of light waves. It is used to measure the shape and quality of an optical wavefront, which is a surface of constant phase that describes the propagation of light through space. The wavefront sensor works by detecting deviations in the phase of the light as it passes through a test object or sample, such as a lens or mirror. These deviations can be used to create a map of the wavefront, which can then be used to analyze and correct aberrations in the optical system. FIG. 2 is a diagram depicting a single-pass wavefront tester 4. FIG. 2 depicts a wavefront tester 4 for measuring the wavefront of a sample or lens under test 22 via an optical path, the wavefront tester including an imaging lens 18, an aperture 16, a collimating lens 20, a wavefront sensor 10, an optical lens 24 disposed in the optical path, a light source 12 directed in a direction through the optical path characterized by the collimating lens 20, the sample 22, the optical lens 24, the aperture 16 and the imaging lens 18 to be received at the wavefront sensor 10. In one embodiment, the light source 12 is configured to be a spatial filtered light source with a spatial filter 14.

Figure 3:
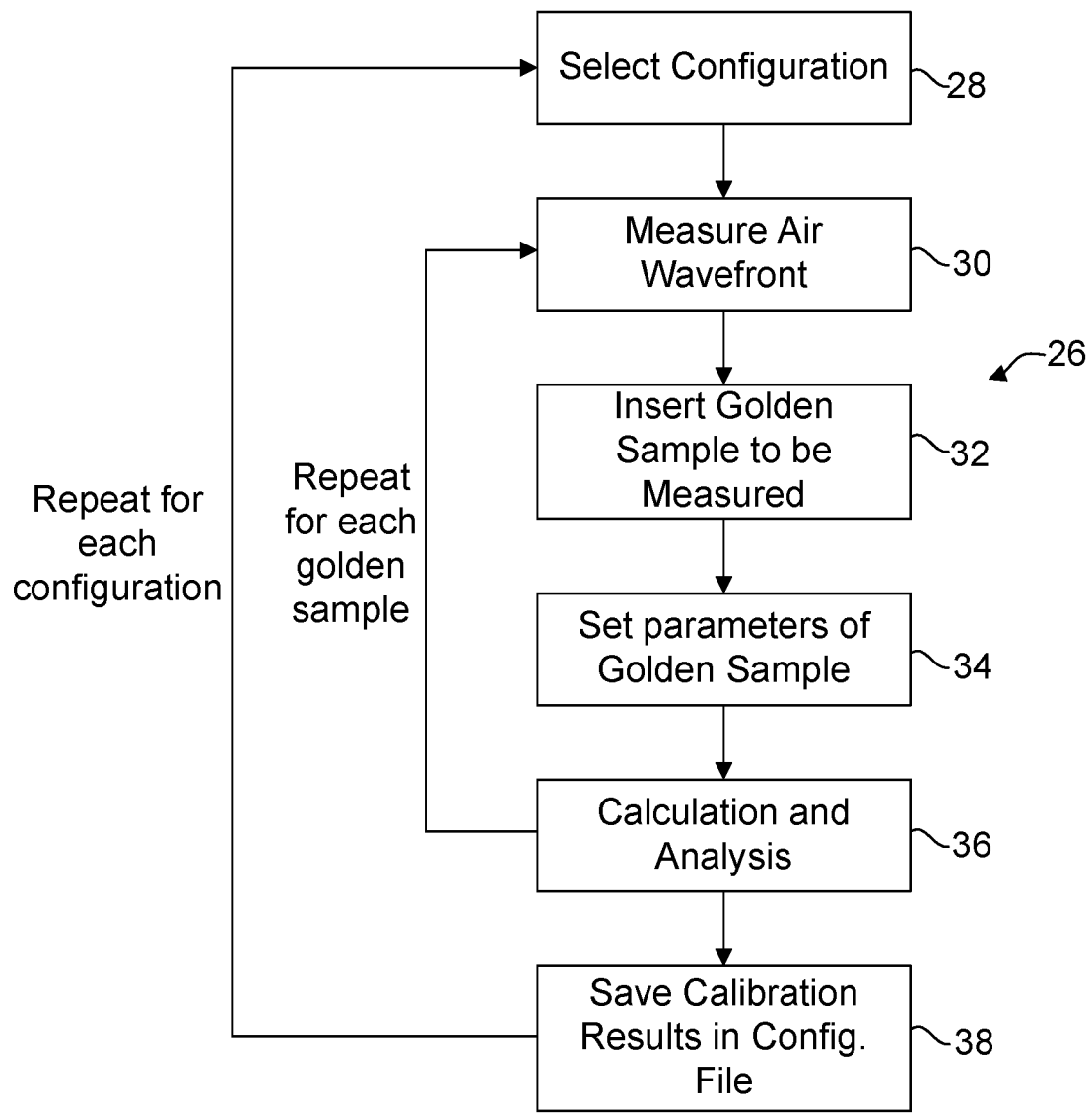
FIG. 3 is a diagram depicting a method for calibrating a wavefront tester using wedges.

FIG. 3 is a diagram depicting a method 26 for calibrating a wavefront tester using wedges. A wedge can be a lens or a combination of optical components from which wavefront measurements are to be obtained. A suitable optical lens 24 commensurate with the size of the sample 22 is selected and disposed in the position shown in FIG. 1 or FIG. 2. Referring to FIGS. 1-3, an air wavefront of the wavefront tester 2 without the lens and the optical system 22 under test is measured as in step 30. A golden sample is then disposed in the optical path and its wavefront is then measured to generate actual wedge angle and refractive index of the golden sample based on the air wavefront as shown in step 32. In one embodiment, the at least one golden sample is an optics of a known shape and surface error distribution. Measured wavefront parameters of the at least one golden sample including the actual wedge angle and refractive index (at laser wavelength) is then saved for subsequent calculations as shown in step 34. The measured wedge angle and refractive index of the golden sample 22 is then calculated based on the actual wedge angle and refractive index of the golden sample 22. The actual wedge angle and refractive index and the measured wedge angle and refractive index are then linear fitted to produce an actual magnification of the golden sample 22 as shown in step 36. One or more additional golden samples may be measured subsequently using the same process disclosed elsewhere herein so that an average actual magnification can be calculated. The calibration results are then saved in a configuration file for use at a later time as shown in step 38 if the same optical lens 24 is used for measuring the wavefront of another different sample 22. For instance, a series of the golden wedge samples 22 were fabricated with two flat surfaces each with about λ/20 surface flatness. Each golden sample 22 is typically made with a wedge angle of 0.01-0.05 degree and each is pre-measured by using a Zygo® interferometer with an accuracy of less than about 1 arc second. These wedge angles are deemed actual wedge angles of the wedges. If the wavefront of a different golden sample were to be measured where the same optical lens 24 is being used as the optimal optical lens with the different golden sample, the calibration process can be simplified by omitting steps 28 and 38. In one embodiment, the wavefront tester includes a plurality of optical lenses 24 from which to select, the method further includes selecting an optical lens from the plurality of different optical lenses 24 for use in the wavefront tester 2, 4 prior to measuring step 30. The optical lenses 24 have different focal lengths and may be placed at their respective unique positions to produce different spatial resolutions for wavefront measurements. Among other factors, the size of the sample 22 used and the required spatial resolution of the sample 22 dictate the specific optical lens 24 or configuration being chosen. For instance, the selected optical lens 24 shall be suitable for casting light across substantially the entire height and width of the sample disposed in the optical path. With a plurality of optical lenses 24 to choose from, the same tester 2, 4 can be used for wavefront testing provided that a suitable optical lens 24 is inserted in the optical path and an unsuitable optical lens of the same path can be removed. As a result, a wavefront tester which allows the selection of optical lens 24 is capable of handling samples of various sizes at sufficient wavefront measurement accuracies. The calibration process essentially transforms a detected scale in the sensor domain to an actual dimension in the object domain to calculate the actual wavefront, the wedge angle as well as the surface curvature, i.e., object domain w(x, y)⇔sensor domain w(x', y'). Referring back to FIGS. 1 and 3, wedge angle α of the golden sample 22 can be calculated according to the following formulas:

Phase Ø is defined as $(2\pi/\lambda)(n-1)d \times 2$;

Wavefront w is defined as $(n-1)d \times 2$;

Relative thickness d of wedge sample is defined as $w/(2 \times (n-1))$ or $d = y \tan \alpha$;

Wedge Angle α is defined as $\alpha \approx d/y = w/(2 \times (n-1)y)$ or $\alpha = \gamma_1/(2 \times (n-1))$.

Referring back to FIGS. 2 and 3, wedge angle α of the golden sample 22 can be calculated according to the following formulas:

Phase Ø is defined as $(2\pi/\lambda)(n-1)d$;

Wavefront w is defined as $(n-1)d$;

Relative thickness d of wedge sample is defined as $w/(n-1)$ or $d = y \tan \alpha$; and Wedge Angle α is defined as $\alpha \approx d/y = w/((n-1)y)$ or $\alpha = \gamma_1/(n-1)$, where
$\lambda$=wavelength of light source, e.g., 785 nm;
n=refractive index of golden wedge samples, e.g., 1.511;
y=object domain (coordinates), e.g., since the wedge is one dimensional, the only coordinate is y; and
$\gamma_1 = w/y$.

Figure 4:
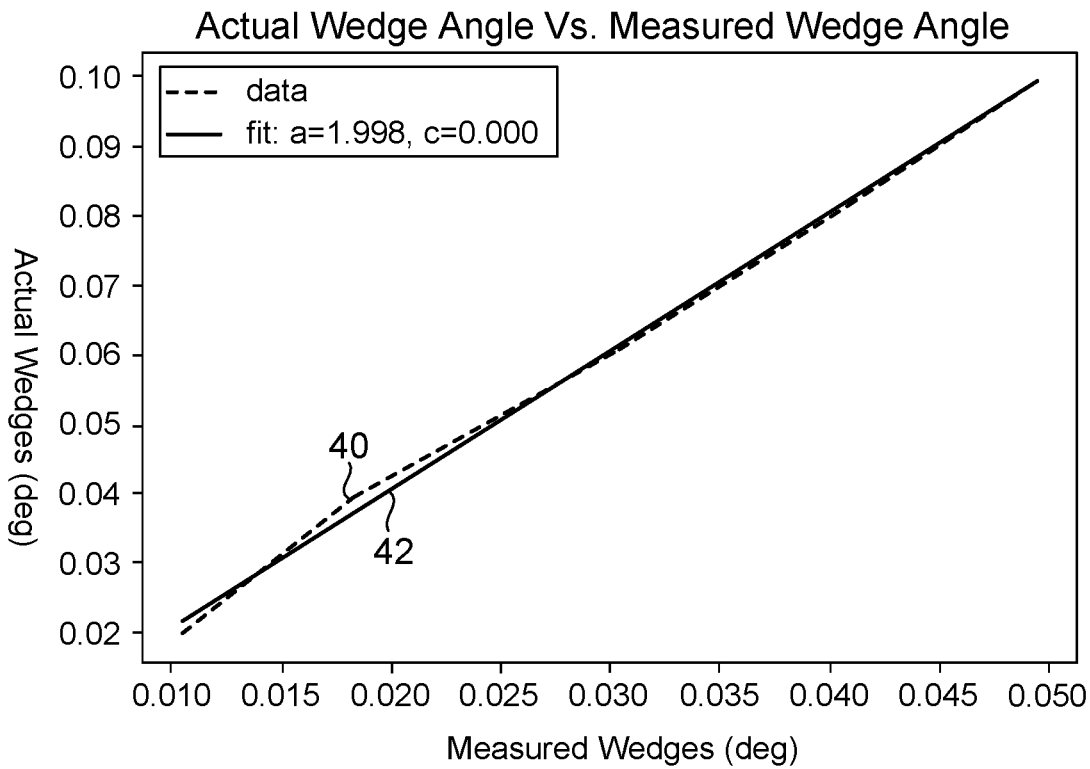
FIG. 4 is one example of a wedge angle calibration curve.
Figure 5:
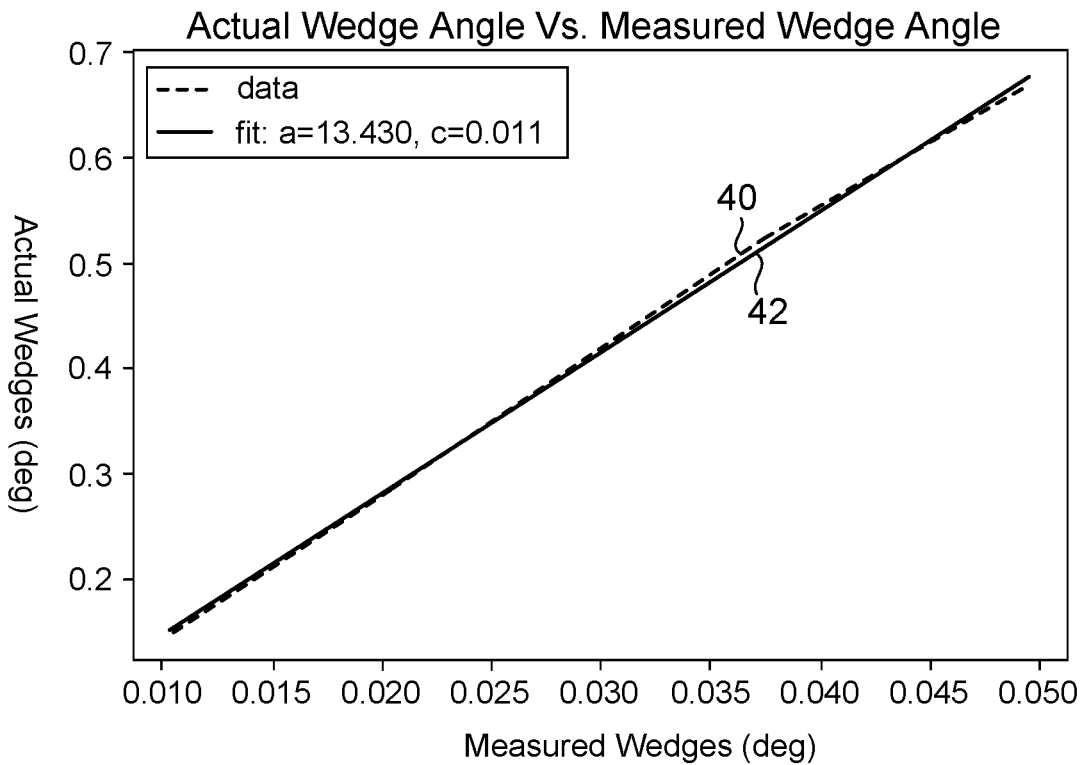
FIG. 5 is one example of a wedge angle calibration curve.

As an example, two configurations, each with a different optical lens 24, are calibrated with different optical magnifications by following the calibration method disclosed elsewhere herein, each using a different golden sample of a different wedge. The wedge angles were pre-measured using an interferometer, e.g., Zygo® interferometer. Each wedge was measured multiple times and the measurements were averaged. For fine configuration, wedge angles were measured at different locations of a sample and then the measurements were averaged. For coarse (or snapshot) measurements, the location is fixed due to the limited sample size and related large beam diameters. Measurement variations were found to be very small with different locations. The average data was fit with a linear function to get the slope which is the calibrated magnification, e.g., 1.998 and 13.430 for fine and coarse configurations, respectively. FIG. 4 is one example of a wedge angle calibration curve. FIG. 5 is one example of a wedge angle calibration curve. It shall be noted that a linear fitting of the data can be obtained between the actual and the calculated wedge angles in each of the plots. Curve 40 represents the data of actual wedge angle vs. measured wedge angle while the straight line 42 represents the linearly fitted line in each of FIGS. 4 and 5.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A wavefront calibration method for a wavefront tester of one of a lens and an optical system under test, said method comprising:
    (a) measuring an air wavefront of the wavefront tester without the lens or the optical system under test;
    (b) measuring a sample wavefront to generate an actual wedge angle and refractive index of said sample based on said air wavefront;
    (c) calculating a measured wedge angle and refractive index based on the actual wedge angle and refractive index of said sample; and
    (d) linear fitting between said actual wedge angle and refractive index and said measured wedge angle and refractive index to produce an actual magnification of said sample.

2. The method of claim 1, further comprising repeating said steps (b)-(d) with another sample to produce a new actual magnification and averaging said new actual magnification and said actual magnification to produce an average actual magnification.

3. The method of claim 1, wherein the wavefront tester comprises a plurality of optical lenses from which to select, said method further comprises selecting an optical lens from the plurality of optical lenses for use in the wavefront tester prior to said step (a).

4. The method of claim 1, wherein said sample is an optics of a known shape and surface error distribution.

5. The method of claim 1, wherein the wavefront tester comprises:
    (a) a mirror;
    (b) an imaging lens;
    (c) an aperture;
    (d) a beam splitter;
    (e) a wavefront sensor;
    (f) an optical lens disposed in the optical path; and
    (g) a light source directed in a first direction through the optical path by said beam splitter through said optical lens and said sample to said mirror such that said light source is redirected in a second direction opposite said first direction through the optical path and said beam splitter, said aperture and said imaging lens to be received at said wavefront sensor.

6. The method of claim 5, wherein said light source is configured to be a spatial filtered light source with a spatial filter.

7. The method of claim 5, wherein said light source comprises a laser light source.

8. The method of claim 1, wherein the wavefront tester comprises:
   (a) an imaging lens;
   (b) an aperture;
   (c) a collimating lens;
   (d) a wavefront sensor;
   (e) an optical lens disposed in the optical path; and
   (f) a light source directed in a direction through the optical path characterized by said collimating lens, said sample, said optical lens, said aperture and said imaging lens to be received at said wavefront sensor.

9. The method of claim 8, wherein said light source is configured to be a spatial filtered light source with a spatial filter.

10. The method of claim 8, wherein said light source comprises a laser light source.

\* \* \* \* \*